Jan. 27, 1953 K. H. STEHR 2,626,583
TRACK-CARRIED HATCH COVER
Filed April 27, 1950 3 Sheets-Sheet 1
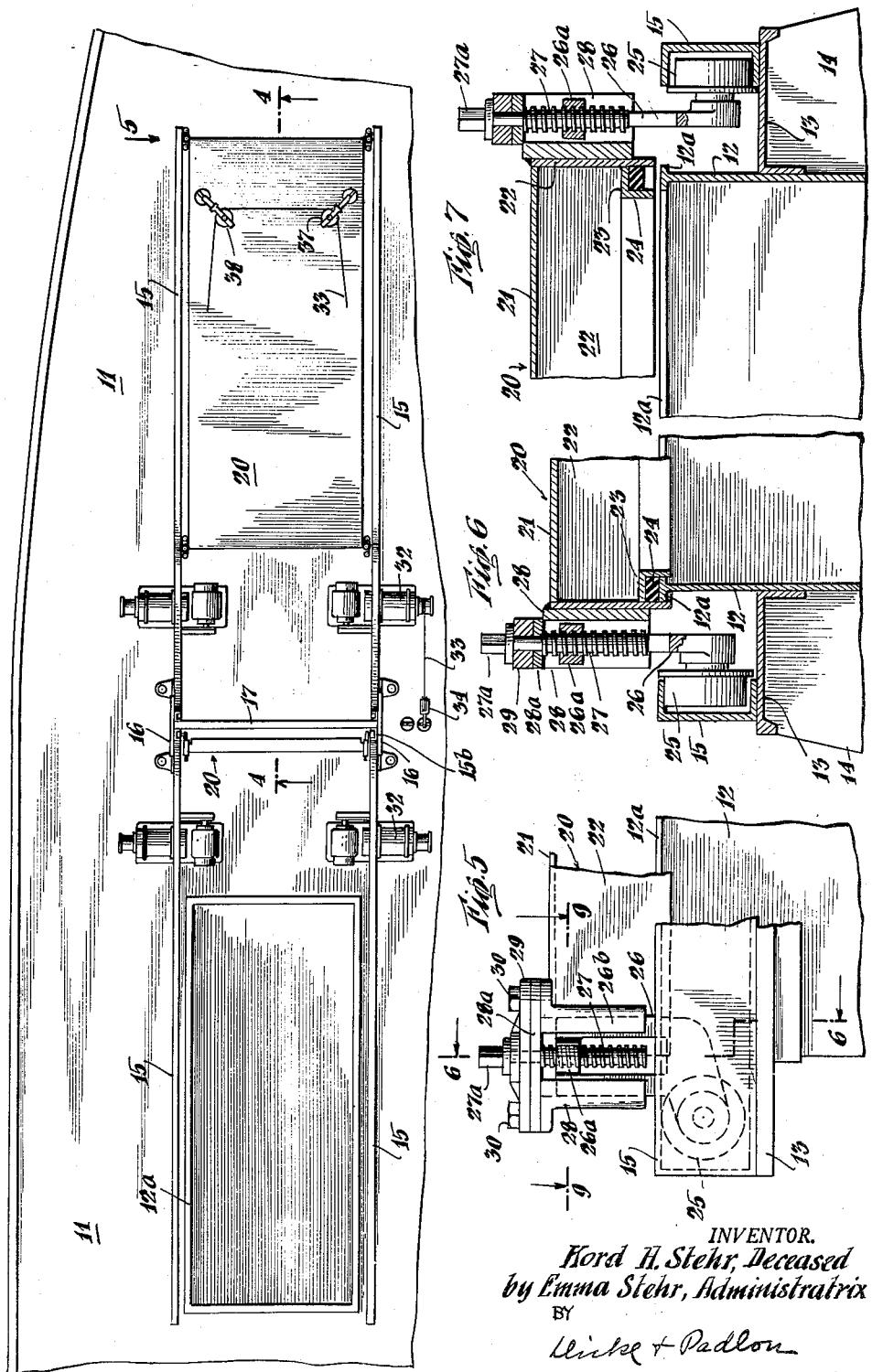
INVENTOR.
Kord H. Stehr, Deceased
by Emma Stehr, Administratrix
BY
Linke & Padlon
ATTORNEYS

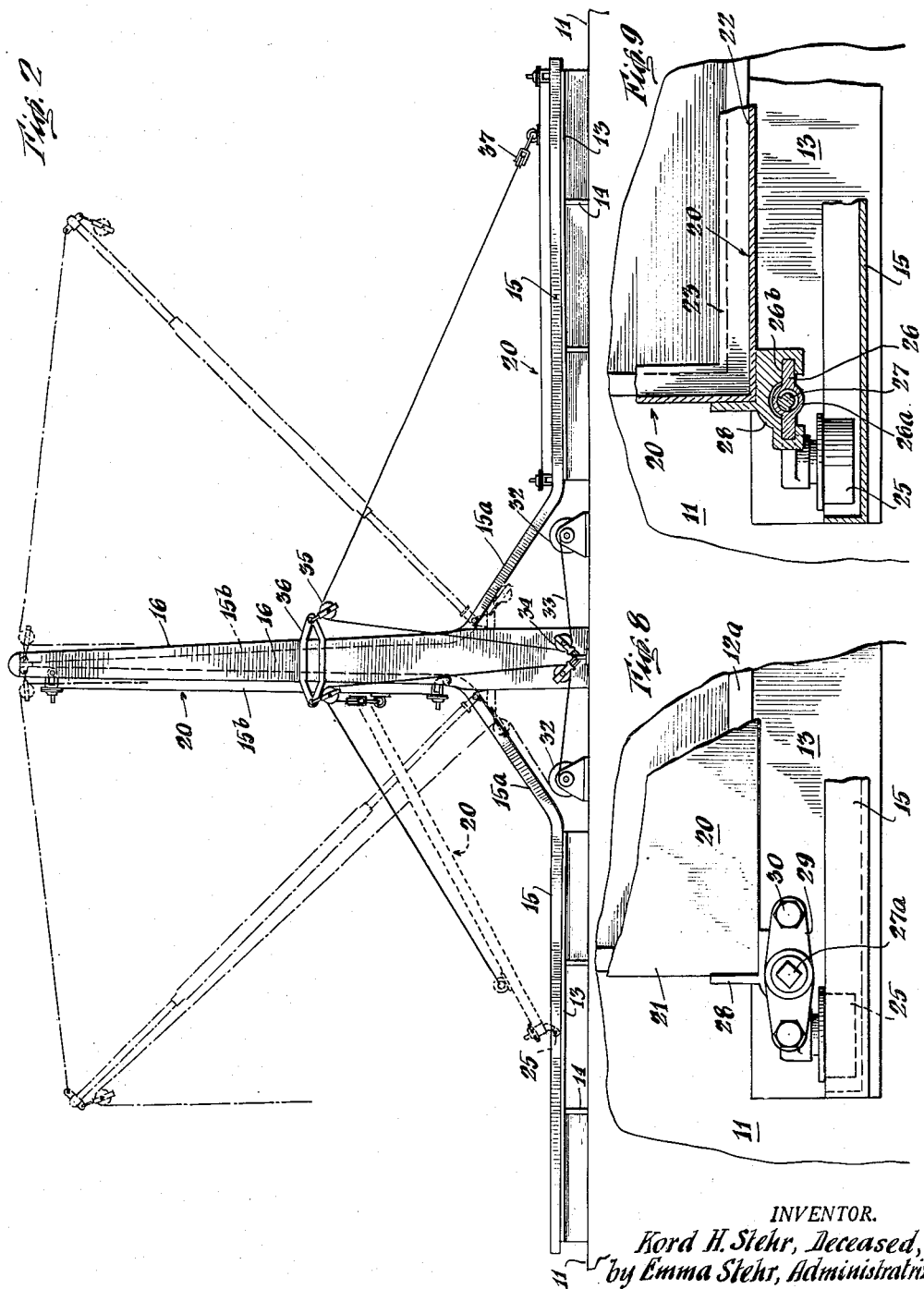

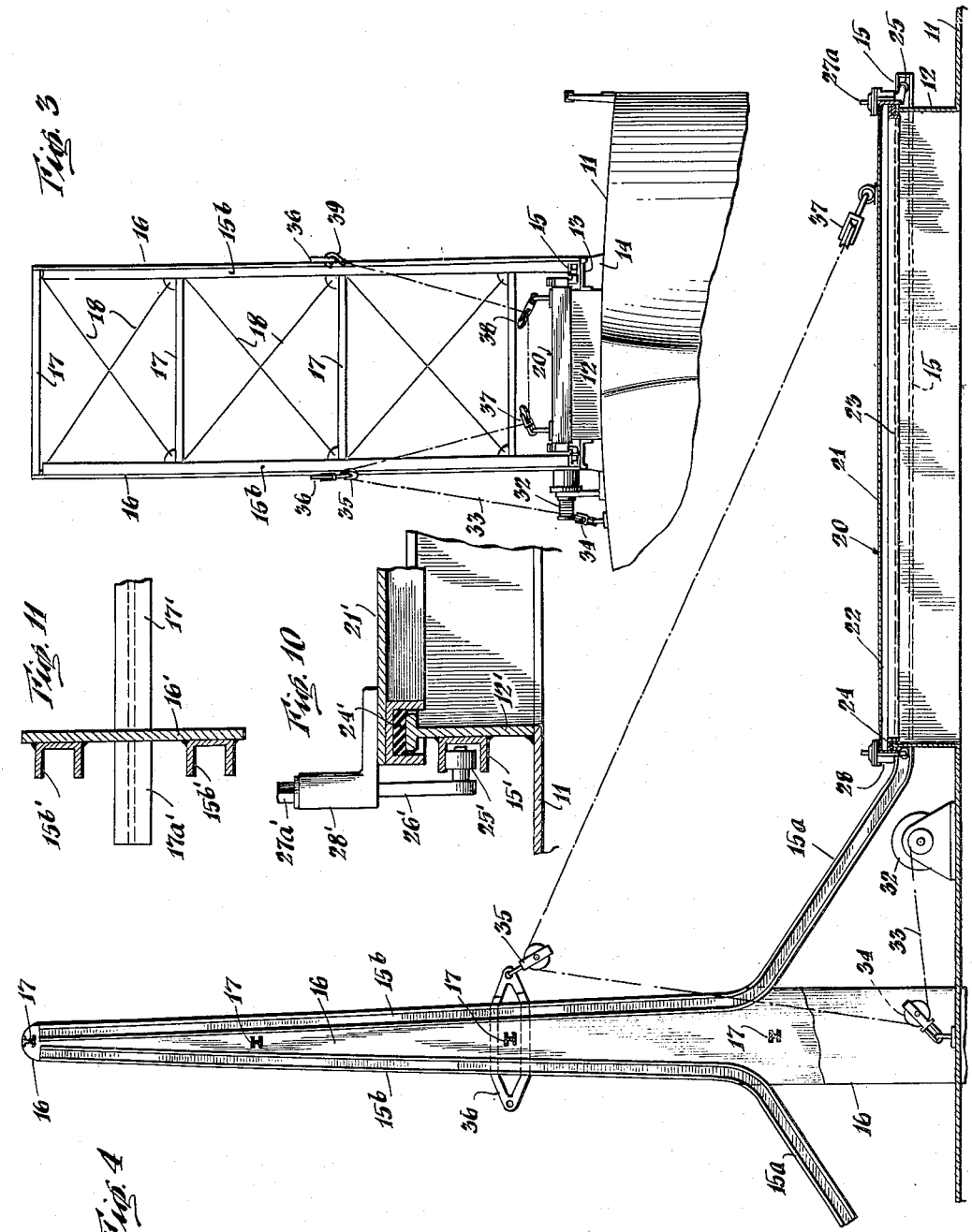

Patented Jan. 27, 1953

2,626,583

UNITED STATES PATENT OFFICE 2,626,583

TRACK-CARRIED HATCH COVER

Kord H. Stehr, deceased, late of Brooklyn, N. Y., by Emma Stehr, administratrix, Brooklyn, N. Y.

Application April 27, 1950, Serial No. 158,402

7 Claims. (Cl. 114—202)

This invention relates to a track-carried hatch cover and has for an object to provide such a cover and associated means which permit the cover to be conveniently removed and replaced, and includes provision for clamping the cover tightly in place.

Hatch covers, as heretofore constructed, have usually consisted of a plurality of separate beams which were laid in position to span the hatch opening, after which a plurality of planks or equivalent members were laid in place over said beams. To make the structure watertight, it has been necessary to cover the hatch cover with a tarpaulin or the like which had to be laced or otherwise held in place. The opening and closing of such a hatch was a difficult, time-wasting operation and frequently resulted in injury to personnel. In some cases, planks or beams have been dropped into the cargo hold causing injury to personnel or damage to the cargo or the ship. Furthermore, if the cover parts were safely removed, they still presented the difficulty of suitable storage since deck space is usually limited and is frequently required for other purposes.

Another object is, therefore, to provide means whereby the cover may be stored in a convenient, out-of-the-way place when removed from the hatch.

Another object is to provide means whereby the hatch cover may be positioned in a substantially vertical plane when it is removed from the hatch opening.

Another object is to provide track means adjacent to the hatch opening with which track means cooperate bearing means connected to the hatch cover whereby the hatch cover may be moved away from the hatch opening along said track means.

Another object is to so construct the bearing means which cooperate with the track means that they may be so adjusted relative to the hatch cover that, at certain times, they serve to clamp the hatch cover in place, and, at other times, serve to raise the hatch cover from the hatch coaming, and serve as transporting means movable along said track means for transporting the hatch cover away from the hatch opening.

Another object is to provide track means, one end of which is adjacent to the hatch opening, and the other end of which is caused to extend into a substantially vertical direction whereby the hatch cover may be transported along said track means from a normal horizontal position to a substantially vertical position.

Other objects will appear from the following description of illustrative embodiments of the invention taken together with the attached drawings wherein:

Fig. 1 is a fragmentary plan view of a ship showing one of the improved hatch cover constructions with the hatch cover in place to cover the hatch opening and showing another such device with the hatch open and the hatch cover in vertical position;

Fig. 2 is a fragmentary, longitudinal elevation corresponding to Fig. 1;

Fig. 3 is a fragmentary front elevation of the structure of Figs. 1 and 2;

Fig. 4 is a fragmentary, longitudinal cross-section taken along the line 4—4 of Fig. 1;

Fig. 5 is a fragmentary elevation of one corner of the hatch cover and associated structure viewed in the direction of arrow 5 in Fig. 1;

Fig. 6 is a fragmentary cross-sectional view taken along the line 6—6 of Fig. 5, the hatch cover being shown in the position where it is clamped onto the hatch coaming;

Fig. 7 is a view similar to Fig. 6 showing the opposite corner of the hatch cover, the cover being shown raised off the hatch coaming;

Fig. 8 is a fragmentary plan view of the parts shown in Fig. 5;

Fig. 9 is a fragmentary cross-sectional view taken on line 9—9 of Fig. 5;

Fig. 10 is a view similar to Fig. 6 showing a modification; and

Fig. 11 is a horizontal cross-sectional view through one of the king posts showing the modified form shown in Fig. 10.

Referring to said figures, 11 designates generally the deck of a cargo ship. 12 designates the hatch coaming having an upper widened edge 12a. Surrounding said coaming is a supporting beam 13 supported at intervals by stud members 14. Firmly attached to the beams 13 are channel shaped track members 15 arranged generally horizontally. As best seen in Figs. 2 and 4, these track members continue as inclined portions 15a beyond which they continue on at substantially vertical portions 15b. The track portions 15b are supported and connected together by means of vertical web members 16 which are tied into the hull structure and are connected together by a plurality of I beams 17. The structure is further strengthened by means of diagonal braces 18. It will be noted that the I beams 17 and braces 18 lie between the vertical portions 15b of the tracks so as not to interfere with the movement of the hatch covers to their vertical positions.

It will be noted that the means just described not only perform the function of providing a support for the hatch covers in raised position but also serve as the usual king posts for supporting cargo handling booms and tackle such as those shown in dotted lines in Fig. 2.

The hatch cover is designated generally by the numeral 20 and consists of a plate 21 of steel or the like formed with a surrounding vertical flange 22 to which is suitably attached, as by welding, an angle beam 23 forming a channel within which is located gasket material 24 cooperating at times with the upper edge 12a of the hatch coaming.

Adjacent each of the four corners of the hatch cover are bearing members including track wheels 25 carried on wheel supporting slides 26 which are slidably mounted in ways 26b (Fig. 9) formed in brackets 28 attached to the corners of the hatch cover 20. The slides 26 are formed with a bridge portion 26a (Figs. 5 and 6) formed with internal screw threads within which is received the lead screw 27, the upper end of which is journalled in the connecting bridge portion 28a of the bracket 28 and also in the cover piece 29 bolted thereon as by means of screws 30. The upper end 27a of screws 27 may be formed square or in any other way adapted for receiving a wrench or other turning implement.

Figs. 5 and 6 show the parts in position with the screw turned to the clockwise limit (viewed from above) so that the slide 26 is drawn upward so that the wheel 25 is drawn against the upper flange of the track channel 15 so that the hatch cover 20 is clamped down onto the hatch coaming causing the gasket 24 to make a watertight joint. With each of the four corners thus clamped down, the hatch cover will be firmly held in place, securely closing the hatch, and assuring that the cover will not vibrate or rattle due to the motion of the ship.

When the hatch is to be opened, the screws 27 are rotated in a counter-clockwise direction (viewed from above) causing the slides 26 to move downwardly relative to the hatch and to the track channels 15 until the wheels 25 engage the lower edge of the track channels 15. Further rotation of the screws will cause the hatch cover to be lifted until the channel containing the gasket 24 completely clears the upper edge 12a of the coaming as shown in Fig. 7. The hatch cover is now wheel borne and is ready to be moved longitudinally off the hatch opening. In the form shown, the cover is to be raised vertically, and, as this takes considerable force, it is necessary to perform this operation by power. To that end, the usual cargo winch 32 may be used. The cable 33 leads from the winch 32 through block 34, thence through block 35 carried by plate 36 on one of the web members 16, thence through block 37 attached to the hatch cover near its trailing edge, thence through block 38 attached to the cover near its trailing edge and more or less in line with block 37, and thence extending to a hook 39 connected to a similar plate 36 on the other king post 16. It will be seen that, when the cable is taken up by the winch 32, the hatch cover will be drawn toward the king posts. The leading supporting wheels 25 will rise up the inclined portions 15a of the track channels and upon further movement will ascend along the vertical track portions 15b, first assuming the dotted line position shown at the left in Fig. 2, and further movement will cause the hatch cover to assume the substantially vertical position shown in full lines at the left in Fig. 2. It will be seen that the hatch is now open and the hatch cover is raised up out of the way. This operation can be performed very quickly. If it is now desired to close the hatch, it is merely necessary to reverse the winch and allow the hatch to slide down the track channels until it resumes its position over the hatch opening, whereupon rotation of screws 27 will first allow the hatch cover to settle in place, and will thereupon raise the wheels 25 from contact with the lower edges of the track channels into contact with the upper edges thereof, and further rotation of the screws will cause the hatch cover to be clamped tightly upon the hatch coaming.

It will be noted that the slides 26 located at the trailing edge of the cover are formed with an offset as shown clearly in Figs. 4 and 5. This is desirable to assure that, when the leading edge of the hatch cover is raised as its wheels travel up the track sections 15a and 15b, the trailing edge will not be depressed enough to have the hatch cover bear on the coaming. By moving the wheel center beyond the end of the hatch cover, such interference is prevented. This offset construction is not necessary insofar as the wheels at the leading edge of the hatch cover are concerned, and, therefore, these wheels may be in line with the axis of the screws as shown in Figs. 2 and 4.

Similarly, it is not necessary that the intermediate portions 15a of the track channels be made as shown since the intermediate sections might constitute curved portions connecting the horizontal with the vertical sections.

Another contemplated modification is shown in Figs. 10 and 11. Whereas, in the form illustrated in Figs. 1 to 9, inclusive, the channel shaped track is so arranged that the open side of the channel faces toward the hatch coaming, Figs. 10 and 11 illustrate that this arrangement may be reversed. In this form, the track channels 15' are close to the coaming and are shown attached to the coaming wall 12'. The wheels 25' are carried on slide arms 26' telescopically connected with the brackets 28' being adjustable relative thereto by a lead screw (not shown) or equivalent means operated by squared extension 27a'. As appears from Fig. 11, the horizontal portions 15b' of the track channels must be mounted on the outside of the web 16'. With this form of construction, at least some of the cross beams 17' are extended through the web 16' as shown at 17a' to provide a suitable point of connection for blocks and other hoisting tackle.

It is also to be understood that in the situation where the hatch cover may be left on deck in a horizontal position when the hatch is open, the deck itself may serve as a track for supporting the weight of the cover, in which case it is only necessary to provide horizontally extending flanges on the side walls of the hatch near the corners of the hatch under which the wheels will bear when the hatch cover is clamped in place.

It will be noted that the constructions shown and described will serve admirably to accomplish the objects stated above. It is to be understood, however, that the constructions disclosed above are intended merely as illustrative of the invention and not as limiting, as various other modifications therein may be made without departing from the invention as defined by a proper interpretation of the claims which follow.

What is claimed is:

1. In hatch construction, in combination, a rectangular hatch coaming, a rectangular hatch cover, a pair of tracks each formed of channel material adjacent to and parallel to two opposite sides of said rectangular coaming, four supports attached to said cover, one near each corner thereof, and two pairs of wheels each journalled to one of said supports, one pair engaging one of said tracks and the other pair engaging the other track, means engaging said supports for vertical adjustment relative to the cover, said wheels being located within the channels of said tracks, whereby when the supports are adjusted downwardly the wheels bear down on said tracks to lift the cover from the coaming and when the supports are raised, the wheels are raised and they pull up on said tracks to clamp the cover down on the coaming.

2. In hatch construction, the combination in accordance with claim 1 wherein each of said tracks is secured in fixed relation to said hatch, extends away from said hatch coaming in a generally horizontal direction and then is curved upwardly to a substantially vertical position, and means for supporting the vertical portion of said tracks.

3. In hatch construction, the combination in accordance with claim 1 wherein each of said tracks is secured in fixed relation to said hatch and extends away from said hatch coaming in a generally horizontal direction.

4. In hatch construction, in combination, a hatch coaming, a hatch cover, two tracks adjacent to and generally parallel to at least one portion of said cover, and arranged on opposite sides thereof, said tracks being each formed with superposed upwardly and downwardly facing surfaces, four spaced supports attached to said cover, bearing means attached to each of said supports and engageable with either the upwardly facing surfaces or the downwardly facing surfaces of said tracks, means connecting said supports for vertical adjustment relative to said cover, said bearing means being arranged to bear down on said upwardly facing surfaces to support said cover on said tracks or to pull up against said downwardly facing surfaces of said tracks to draw said cover down upon said coaming.

5. In hatch construction, in combination, a rectangular hatch coaming, a rectangular hatch cover, two tracks adjacent to and generally parallel to two opposite sides of said cover, said tracks being each formed with superposed upwardly and downwardly facing surfaces, four supports attached to said cover, one near each corner thereof, bearing means attached to each of said supports and engageable with either the upwardly facing surfaces or the downwardly facing surfaces of said tracks, means connecting said supports for vertical adjustment relative to said cover, said bearing means being arranged to bear down on said upwardly facing surfaces to support said cover on said tracks or to pull up against said downwardly facing surfaces of said tracks to draw said cover down upon said coaming.

6. In hatch construction, in combination, a hatch coaming, a hatch cover, tracks adjacent to and generally parallel to at least one portion of said cover, said tracks being each formed with an upwardly facing surface and a downwardly facing surface, and a plurality of bearing means attached to said cover and interposed between said surfaces of said tracks and engageable with the said upwardly facing or downwardly facing surfaces, said bearing means being slidably attached to said cover and means secured to the bearing means for causing vertical movement of said bearing means relative to said cover both upwardly and downwardly, said bearing means being arranged to bear down on said upwardly facing surfaces to support said cover on said tracks or to pull up against said downwardly facing surfaces of said tracks to draw said cover down upon said coaming.

7. In hatch construction, in combination, a hatch coaming, a hatch cover, tracks adjacent to and generally parallel to at least one portion of said cover, said tracks being each formed with an upwardly facing surface and a downwardly facing surface, and a plurality of bearing means attached to said cover and interposed between said surfaces of said tracks and engageable with the said upwardly facing or downwardly facing surfaces, said bearing means being slidably attached to said cover and means secured to the bearing means for causing vertical movement of said bearing means relative to said cover both upwardly and downwardly, said bearing means being arranged to bear down on said upwardly facing surfaces to support said cover on said tracks or to pull up against said downwardly facing surfaces of said tracks to draw said cover down upon said coaming, the vertical dimensions of said bearing means being less than the distance between the upwardly and downwardly facing surfaces of said tracks so that play exists between said track surfaces and said bearing means so that the bearing means can at one time engage only the upwardly facing or the downwardly facing surfaces of said tracks.

EMMA STEHR,
*Administratrix of the Estate of Kord H. Stehr, Deceased.*

REFERENCES CITED

The following references are of record in the file of this patent:

UNITED STATES PATENTS

| Number | Name | Date |
| --- | --- | --- |
| 294,108 | Ballard | Feb. 26, 1884 |
| 1,158,946 | McGray | Nov. 2, 1915 |
| 1,835,856 | Fliegel | Dec. 8, 1931 |

FOREIGN PATENTS

| Number | Country | Date |
| --- | --- | --- |
| 14,623 | Australia | July 24, 1929 |
| 112,877 | Australia | Apr. 24, 1941 |